: 2,860,037

PROCESS FOR PRODUCTION OF CALCIUM CARBIDE AND PHOSPHORUS

Jonas Kamlet, Easton, Conn.

No Drawing. Application December 4, 1952
Serial No. 324,143

11 Claims. (Cl. 23—208)

This invention relates to a novel chemical process and, more particularly, to a chemical process for the joint electrothermal manufacture of elemental phosphorus and calcium carbide.

In German Patent 92,838 (1895), Hilbert and Frank have described a process for the manufacture of elemental phosphorus and calcium carbide which comprises reducing calcium phosphate with carbon in the electric furnace. The primary reaction which occurs is:

$$Ca_3(PO_4)_2 + 14C \rightarrow 3CaC_2 + 8CO + 2P$$

Phosphorus is volatilized and recovered by scrubbing the off-gases with water and condensation of the phosphorus contained therein.

However, a major disadvantage of this process resided in the fact that a secondary reaction occurred.

$$Ca_3(PO_4)_2 + 8C \rightarrow Ca_3P_2 + 8CO$$

with the result that the end-product calcium carbide contained from 3% to 8% of calcium phosphide. On reaction with water, an explosive mixture of acetylene and phosphine would be generated. This drawback was so serious that it was even impractical to cool and store the end-product calcium carbide since it would react with atmospheric moisture to form poisonous and inflammable mixtures of acetylene and phosphine.

To overcome this difficulty, Caro and Frank developed a process whereby phosphorus formation is combined with the manufacture of calcium cyanamide in a single operation. A charge of a briquetted mixture of calcium phosphate and carbon is heated in three steps at different temperature levels while nitrogen is passed through the charge (first at 1200°–1600° C. for several hours, then for three hours at 1850°–1870° C., then for three hours at 1000°) (German Patent 609,730 (1935); French Patent 720,098 (1931); Dutch Patent 34,424 (1934)). These inventors have also found that, in their process, it is necessary to avoid fusion of the charge if efficient nitrogen fixation is to take place. They therefore advise the use of a silica-free or silica-poor source of carbon (e. g. foundry coke, anthracite, etc.) to obviate the formation of calcium silicates which act as fluxes for the intermediate calcium carbide. (Caro and Frank, German Patent 616,988 (1935).) This finding is counter to the teaching of the art. It is customary industrial practice in the cyanamide process at the present time to add calcium chloride or calcium fluoride to the calcium carbide charge prior to nitrification to serve as a flux since the reaction is believed to occur in the liquid phase. This fusion is known to occur during the nitrification reaction since the reagents are charged in a briquetted form and the end-product calcium cyanamide is recovered as a well-sintered pig (Kasten and McBurney, Industrial and Engineering Chemistry 43, 1020–1033 (May 1951).

This combined process of Caro and Frank has never attained any industrial significance, largely because of the great difficulty involved in carefully controlling the temperature ranges and gradients in the electric furnace, an essential feature of the process.

The basis of this invention is the finding that molten calcium carbide produced by the reduction of calcium phosphate-containing minerals with carbon can be completely freed of its calcium phosphide content by a short treatment with gaseous nitrogen. The end-product obtained by this process is completely suitable for the generation of acetylene, as well as for further nitrification, in a separate operation, to form calcium cyanamide. Unlike the teachings of Caro and Frank (German Patent 616,988), this invention envisages the intermediate formation of a fused or partially fused calcium carbide.

The raw materials for this process are a calcium phosphate-containing material and a source of carbon. As a source for the calcium phosphate, the following minerals can be employed:

(a) Fluorapatite—$3Ca_3(PO_4)_2 \cdot CaF_2$ (b) Chloroapatite—$3Ca_3(PO_4)_2 \cdot CaCl_2$ (c) Hydroxyapatite—$3Ca_3(PO_4)_2 \cdot Ca(OH)_2$
formed by the calcination or defluorination of phosphate rock at advanced temperatures, or by prolonged geologic degradation of other apatites (d) Phosphorite—$3Ca_3(PO_4)_2 \cdot CaF_2$ (e) Bone, bone ash or bone products containing $Ca_3(PO_4)_2$ with varying amounts of $CaCO_3$ The presence of calcium fluoride and/or calcium chloride in the apatite minerals serves a very useful and important purpose in the present invention, viz.—as fluxing agents to reduce the temperature at which the calcium carbide will fuse or melt. Most of these minerals also contain varying amounts of silica, which reacts with the calcium phosphate at the temperature of the electric furnace to form calcium silicates of varying compositions. These calcium silicates also serve as fluxes for the calcium carbide and reduce the temperature at which the calcium carbide will fuse or melt. Any iron oxide present in these $Ca_3(PO_4)_2$—containing minerals will be reduced to elemental iron. The latter takes up part of the elemental phosphorus formed and is tapped from the furnace as ferrophosphorus in accordance with the well-known industrial procedure.

The source of carbon for this process may be anthracite or bituminous coal, coke, pitch, petroleum coke, coal tar pitch, petroleum pitch, charcoal of any nature and, in fact, any material yielding carbon under the conditions of the reaction.

The process is effected in an electric furnace of any suitable design, such as is at present used for the manufacture of phosphorus. This furnace need be modified to permit a stream of nitrogen to be passed through the calcium carbide melt (which will occupy the same approximate position in the furnace as is now occupied by the calcium silicate slag).

The following reactions occur in the furnace:

(a) As a primary reaction:

$$Ca_3(PO_4)_2 + 14C \rightarrow 3CaC_2 + 2P + 8CO - 748,900 \text{ calories}$$

(b) As secondary reactions:

$$Ca_3(PO_4)_2 + 8C \rightarrow Ca_3P_2 + 8CO - 664,920 \text{ calories}$$

$$Ca_3(PO_4)_2 + 5C + (1 \text{ to } 3 \text{ SiO}_2) \rightarrow (CaO)_3(SiO_2)_{1-3} +$$
$$2P + 5CO - (365,350 \text{ to } 376,450 \text{ calories})$$

When the calcium carbide melt is treated with nitrogen to free it of calcium phosphide, the following reaction is believed to occur:

$$Ca_3P_2 + N_2 \rightarrow Ca_3N_2 + 2P$$

No calcium cyanamide is formed at the temperature of molten calcium carbide. However, as the calcium carbide cools to within the nitrification range (900°–1200° C.), it is believed that the following reaction occurs:

$$Ca_3N_2 + 5C \rightarrow 2CaC_2 + CaCN_2$$

Thus, the overall reaction involved in the calcium phosphide removal step is believed to be:

$$Ca_3P_2 + N_2 + 5C \rightarrow 2CaC_2 + CaCN_2 + 152,480 \text{ calories}$$

The charge to the electric furnace should contain at least fourteen moles of carbon per mole of calcium phosphate (i. e. as required by theory), and preferably a 20%–30% excess of carbon, i. e. about three parts of $Ca_3(PO_4)_2$ to two parts of carbon. These proportions are by no means critical. The charge may be widely varied in composition without materially affecting the process of the present invention.

The furnace charge is prepared by grinding the reagents separately or together, followed by one of the well-known procedures used in the art for such preparation, i. e. pelletizing by tumbling or extrusion, briquetting with a suitable binder (such as pitch, mollasses, or similar organic material which will not interfere in the subsequent furnacing), agglomeration by nodulizing at advanced temperatures or sintering together a mixture of powdered coke and phosphate fines.

The charge is fed to the phosphorus furnace in the well known procedure of the prior art. The furnace may be operated at a temperature between 1200° C. and 2200° C., and preferably between 1800° C. and 2200° C. Actually, the temperature in the furnace will vary over quite a broad range and is by no means critical in the process of this invention. At 1200° C., all of the phosphate in the charge will have been completely converted either to elemental phosphorus, calcium phosphide or ferrophosphorus. Although Takao (Bull. Chem. Soc. Japan 16, 92–98 (1941) indicates that calcium carbide will sinter at 950° C. and melt at 1150° C. under a nitrogen atmosphere, higher temperatures (i. e. 1800° C. to 2200° C.) and the presence of fluxes (such as $CaF_2$, and $CaCl_2$ present in the apatite or phosphorite or added separately for this specific purpose to the charge, as well as the calcium silicates produced during the furnacing by interaction of the silicate and the calcium phosphate in the mineral) are preferred (but not absolutely necessary) to obtain a free-flowing calcium carbide melt.

During the furnacing, phosphorus and carbon monoxide will be evolved, in the usual manner, as hot gases. These are passed through hot precipitators and phosphorus condensers to recover the phosphorus content thereof in the manner well known to the art. The by-product carbon monoxide obtained after removal of the phosphorus may be utilized for chemical synthesis (e. g. in the manufacture of sodium formate, methanol, in the "Oxo" reaction, etc.) or burned as fuel.

After the phosphorus evolution is complete, nitrogen gas (preferably preheated by passage through a heat exchange unit) is passed through the melt for 15 to 60 minutes. The gases evolved (excess nitrogen with some phosphorus) are also passed through the hot precipitators and phosphorus condensers, to recover the phosphorus content thereof. The scrubbed, hot, excess nitrogen may be recycled through the furnace, if desired.

Unlike the Caro and Frank process described above, accurate and close control of furnace temperatures, a difficult precaution to arrange, is not required in the process of the present invention.

The following example is given to define and illustrate the present invention but in no way to limit it to reagents, proportions or conditions described therein. Obvious modifications will occur to any person skilled in the art.

*Example*

Phosphate rock (analyzing 78% $Ca_3(PO_4)_2$, 6% $CaF_2$ and 5% $SiO_2$) and bituminous coke (analyzing 85% carbon and 5% $SiO_2$) are ground together in the proportion of 4.0 parts by weight of the phosphate rock to 3.6 parts by weight of the coke (about $3Ca_3(PO_4)_2$ to 2C). The mixture is then pelletized in the usual manner.

The pelleted charge is fed to the electric furnace, where an internal temperature of 1800° C. to 2200° C. is attained during the furnacing. After phosphorus evolution is complete, nitrogen gas (preheated to 1000°–1800° C.) is passed through the charge for an hour. During this entire process, the phosphorus and carbon monoxide are recovered in the usual manner.

After removal of the calcium phosphide by the nitrogen treatment, the ferrophosphorus is tapped from the bottom of the furnace. It is also feasible to tap the ferrophosphorus prior to the nitrogen treatment of the charge.

The molten or partially molten calcium carbide is then tapped into suitable receptacles, e. g. iron cars or buggies, and allowed to solidify and cool. The calcium carbide is then crushed and ground in ball mills in the usual manner.

Yields may vary widely, but a typical materials balance would give the following results:

7.5 tons of phosphate rock, 6.8 tons of coke, 20,000 kwh. of electricity will yield 1.0 ton of phosphorus, 3.6 tons of calcium carbide, 0.13 ton of ferrophosphorus, 9.5 tons of carbon monoxide.

The calcium carbide analyses about 85% $CaC_2$ and 2% calcium cyanamide, the remainder being calcium silicates, calcium fluoride, some carbon, and less than 0.10% unchanged $Ca_3(PO_4)_2$. This material is completely suitable for use in the generation of acetylene, in the manufacture of calcium cyanamide, as a reducing agent in the manufacture of metallic magnesium and in fact for all the uses to which calcium carbide made by conventional processes is now put.

Having described my invention, what I claim and desire to protect by Letters Patent is:

1. A process for the joint manufacture of elemental phosphorus and calcium carbide which comprises reacting a calcium-phosphate-containing mineral with a carbonaceous material in a single reaction zone in the electric furnace to produce simultaneously a phosphorus-containing gas and a calcium carbide product containing calcium phosphide, recovering elemental phosphorus from said phosphorus-containing gas evolved from said zone and thereafter introducing nitrogen gas into the calcium carbide product containing calcium phosphide in said single reaction zone for a period of time sufficient to decompose said calcium phosphide but insufficient to react further with said calcium carbide to form calcium cyanamide.

2. The process of claim 1 wherein the electric furnace is operated at a temperature between 1200° C. and 2200° C.

3. The process of claim 1 wherein the electric furnace is operated at a temperature between 1800° C. and 2200° C.

4. The process of claim 1 wherein the calcium phosphate-containing mineral is a member of the group consisting of fluorapatite, chloroapatite, hydroxyapatite and phosphorite.

5. The process of claim 1 wherein the furnace charge contains at least fourteen gram-atom of carbon for each gram mole of tribasic calciumphosphate.

6. The process of claim 1 wherein a member of the group consisting of calcium chloride and calcium fluoride is added to the furnace charge to serve as a flux and lower the fusion temperature of the end-product calcium carbide.

7. The process of claim 1 wherein a calcium phosphate-containing mineral is chosen as a raw material which mineral also contains a member of the group consisting of calcium chloride and calcium fluoride, said member serving as a flux to lower the fusion temperature of the end-product calcium carbide.

8. The process of claim 1 wherein the calcium phosphate-containing mineral is an apatite.

9. The process of claim 1 wherein the calcium phosphate-containing mineral is fluorapatite.

10. The process of claim 1 wherein the calcium phosphate containing mineral is phosphorite (phosphate rock).

11. The process of claim 1 where the calcium-phosphide-containing calcium carbide product is reacted with nitrogen for a period of from 15 to 60 minutes whereupon said calcium phosphide is decomposed and no substantial conversion of calcium carbide to calcium cyanamide occurs.

References Cited in the file of this patent

UNITED STATES PATENTS

| | | |
|---|---|---|
| 589,967 | Heath | Sept. 14, 1897 |
| 862,092 | Morehead | July 30, 1907 |
| 1,374,317 | Norton | Apr. 21, 1921 |
| 2,052,920 | Caro | Sept. 1, 1936 |
| 2,289,538 | Buford | July 14, 1942 |

FOREIGN PATENTS

| | | |
|---|---|---|
| 16,255 | Great Britain | of 1896 |

OTHER REFERENCES

Mellor: "Comprehensive Treatise on Inorganic and Theoretical Chemistry," 1928, vol. 8, page 841.

Thorpe: "Dictionary of Applied Chemistry," Revised and Enlarged Edition, 1916, page 605.